United States Patent

[11] 3,627,249

| [72] | Inventor | Richard D. Lipinski<br>Arlington Hgts., Ill. |
|---|---|---|
| [21] | Appl. No. | 11,257 |
| [22] | Filed | Feb. 13, 1970 |
| [45] | Patented | Dec. 14, 1971 |
| [73] | Assignee | Motorola, Inc.<br>Franklin Park, Ill. |

[54] MOUNTING ASSEMBLY FOR RATIO CONTROL HEAD
4 Claims, 9 Drawing Figs.

[52] U.S. Cl.................................................. 248/223
[51] Int. Cl..................................................... A47f 5/00
[50] Field of Search......................................... 248/201,
202, 223, 225, 278, 279, 311, 475 A, 475 B, 477, 485

[56] References Cited
UNITED STATES PATENTS

| 116,589 | 7/1871 | Hartman .................... | 248/278 X |
| 1,461,285 | 7/1923 | Olsen .......................... | 248/278 |
| 1,840,768 | 1/1932 | Doane ......................... | 248/278 |
| 2,202,365 | 5/1940 | Zeman ......................... | 248/311 |
| 2,738,942 | 3/1956 | Gantner ....................... | 248/311 X |
| 2,988,315 | 6/1961 | Saxe ............................ | 248/223 |

FOREIGN PATENTS

| H.25,898 | 5/1956 | Germany..................... | 248/475 A |

*Primary Examiner*—William H. Schultz
*Attorney*—Mueller & Aichele

ABSTRACT: A mounting assembly for releasably holding a radio control head in an underslung position under the dashboard of a motor vehicle. The mounting assembly is formed of a retainer which is fixedly secured to the dashboard of the motor vehicle. A trunnion bracket fixedly secured to the radio control head and a releasable plug member is connected between the retainer and the bracket to be pulled apart upon impact with the radio control head.

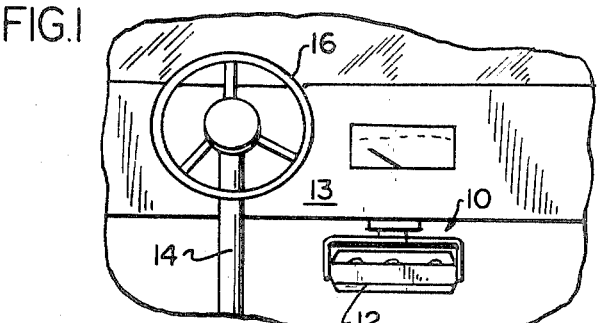
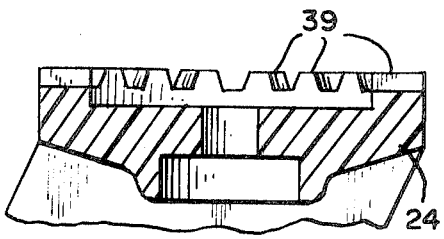
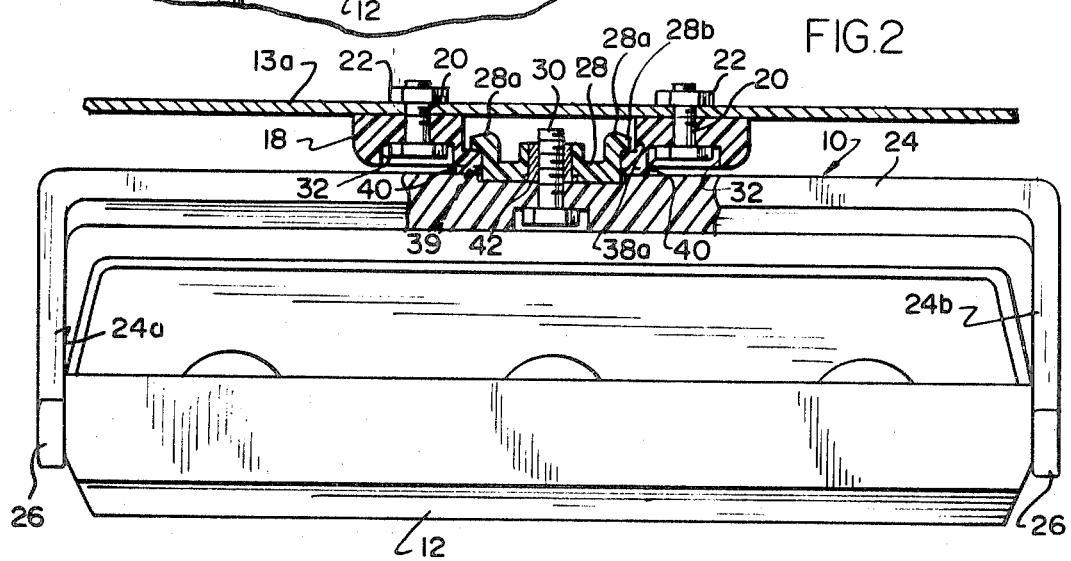
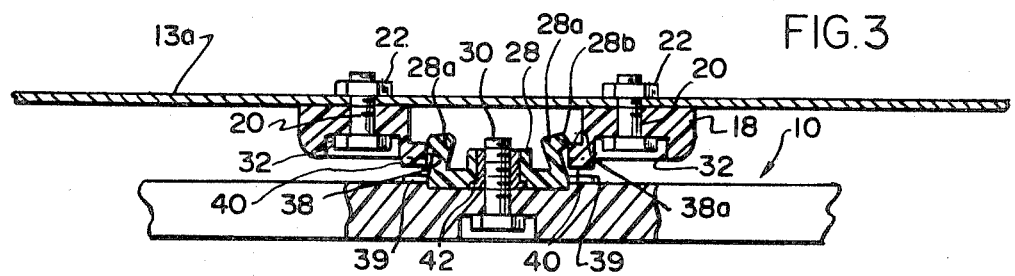
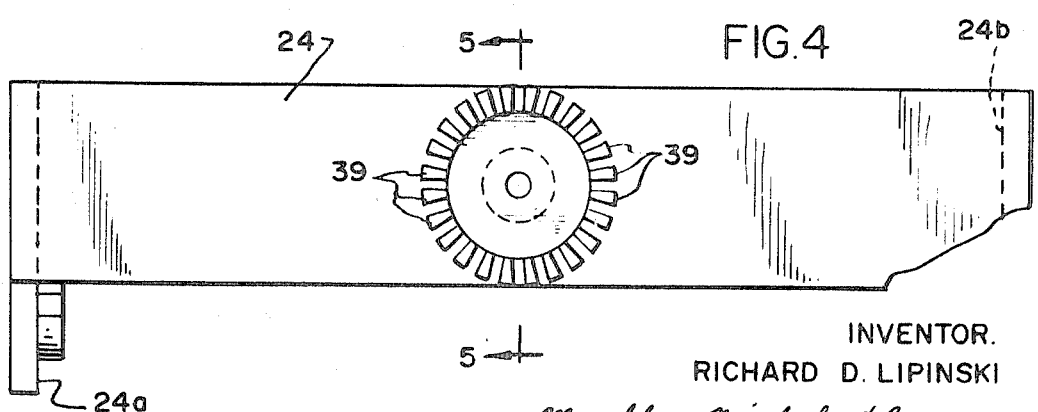
INVENTOR.
RICHARD D. LIPINSKI

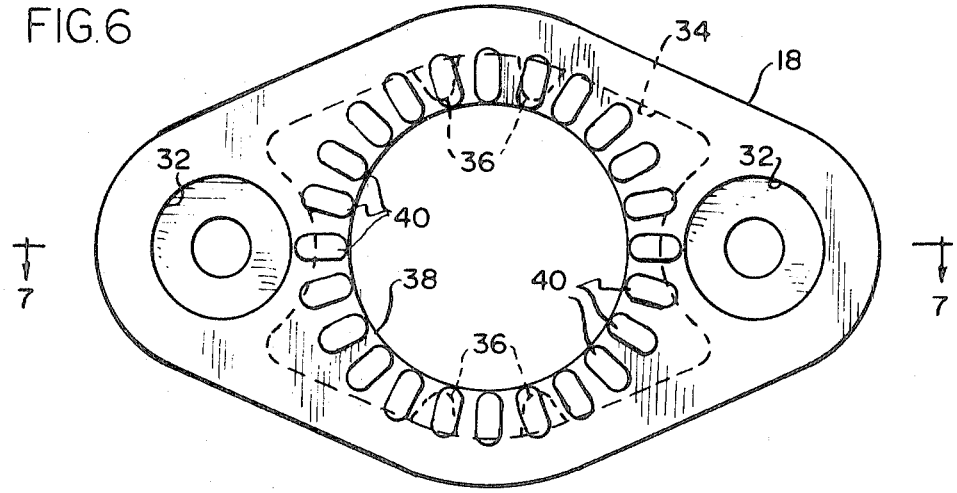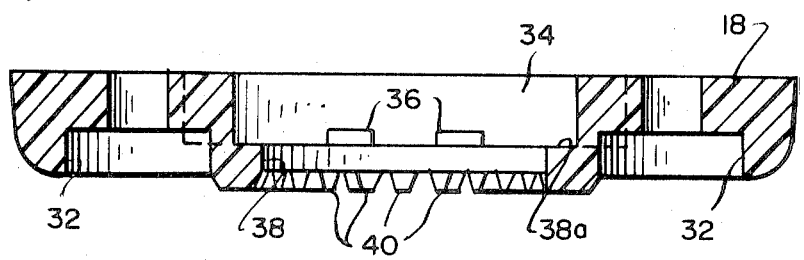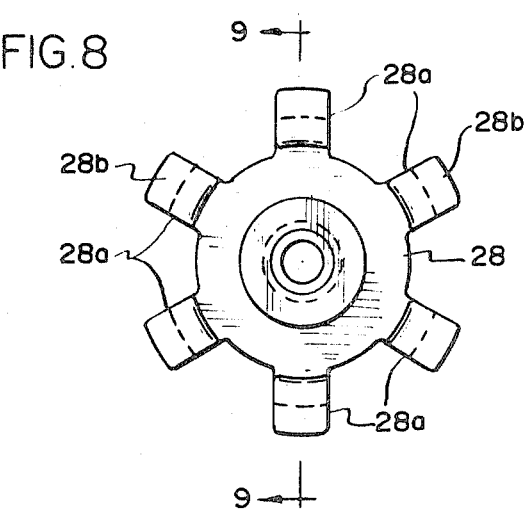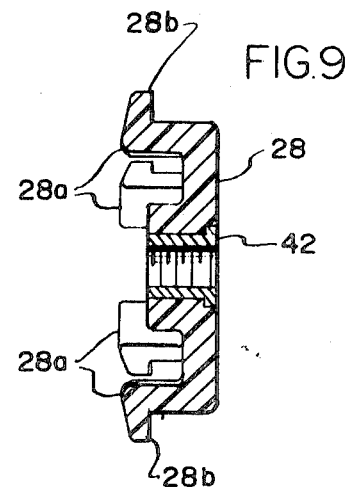

1

MOUNTING ASSEMBLY FOR RATIO CONTROL HEAD

BACKGROUND OF THE INVENTION

This invention relates generally to mounting brackets, and more particularly to mounting brackets for control heads of radio communications apparatus which is secured to the underside of the dashboard of a motor vehicle.

Mobile communication equipment has greatly simplified communications between an operator of motor vehicle and some base station, as well as between respective different operators of a plurality of motor vehicles. Such mobile communication equipment, particularly the commercial type, is broken up into several separate major components to be mounted within a motor vehicle at respective different locations and interconnected by cables. For example, a main receiver and power transmitter unit may be located in any convenient space in the motor vehicle such as the trunk or under the dashboard or in an out-of-the-way position while the control head for the radio is mounted at the forefront of the dashboard, in an underslung position to be readily accessible to the operator of the motor vehicle.

Although the mobile communication apparatus has found widespread and popular use, and is a highly desirable piece of equipment, the control head may tend to become a dangerous piece of equipment due to the position it occupies within the motor vehicle. That is, the control head being mounted at the forefront and underslung position of the dashboard for easy reach by the operator may tend to cause severe knee injury should the vehicle collide with an obstruction or stop abruptly to cause the operator, or a passenger, to be thrown forward striking his knee upon the exposed radio control head. The resulting knee injuries which may occur to operators of motor vehicles may further increase because of the collapsible feature of the steering wheel now incorporated in many vehicles as a safety feature. The collapse of the steering wheel allows the driver of the vehicle to be thrown forward so that it is possible for his knee to strike the radio control head with a force sufficient to seriously injure the driver.

SUMMARY OF THE INVENTION

Accordingly, it is an object of this invention to provide a mounting bracket for the control head of a radio communication apparatus which allows the control head to break away upon being smartly struck at impact either by the operator's knee or by a passenger's knee, or by any other object which happens to strike upon the control head.

Another object of this invention is to provide a break away mounting bracket for a radio control head which requires no additional components to be reassembled to a supporting condition after the bracket has been knocked apart as the result of impact therewith.

A still further object of this invention is to provide a mounting bracket for a radio control head which is inexpensive to manufacture, efficient and reliable in operation, and which is readily assembled after being knocked apart as a result of impact.

A feature of this invention is the use of indexing means on the retainer and mounting bracket which allows pivotal indexing of a radio control head so as to position the control head facing the operator thereof.

BRIEF DESCRIPTION OF THE DRAWINGS

FIG. 1 is a fragmentary diagrammatic representation of the dashboard and front portion of a motor vehicle which receives a radio control head and mounting bracket constructed in accordance with this invention;

FIG. 2 is an enlarged, partially sectional view showing the mounting bracket of this invention supporting a radio control head to the under portion of the dashboard of FIG. 1;

FIG. 3 illustrates the mounting bracket in a state of being pulled apart, i.e. break away, upon impact;

FIG. 4 is a top view of the trunnion bracket portion shown in FIG. 2;

FIG. 5 is a sectional view taken along section line 5—5 of FIG. 4;

FIG. 6 is a bottom view of the retainer which is shown bolted to the under portion of the dash panel of FIGS. 2 and 3;

FIG. 7 is a sectional view taken along line 7—7 of FIG. 6;

FIG. 8 is a top view of a releasable plug member which extends into the retainer of FIGS. 6 and 7; and FIG. 9 is a sectional view taken along line 9—9 of FIG. 8.

DESCRIPTION OF THE PREFERRED EMBODIMENT

Referring now to FIG. 1, a mounting assembly 10 is provided for supporting a radio control head 12 to the underside of a dash panel 13 in a position convenient for the operator of the motor vehicle to reach while the motor vehicle is moving. FIG. 1 also illustrates a steering column 14 and a steering wheel 15. In modern vehicles the steering column and/or the steering wheel, either together or separately, can be collapsible upon collision of the motor vehicle so as to move away from the operator. This action may tend to cause the knee of the operator to strike the radio control head 12. In the past, such action would cause severe leg or knee injuries to the operator. However, in accordance with this invention, the radio control head will break away from its mounted position as a result of the mounting assembly 10 coming apart under a force which is much less than the force generally required to do severe leg or knee injury to a person operating a motor vehicle.

FIG. 3 more clearly illustrates the details of the mounting assembly 10. The assembly 10 includes a retainer member 18, preferably of any suitable material such as molded plastic or the like. The retainer 18 is secured to the rearwardly extending underwall portion 13a of the dash panel 13 by a pair of bolts 20 which extend through dash panel 13a and receive nuts 22 at their free ends to lock the retainer 18 in a permanent position to the dash panel 13, this mounting being conventional and well known in the art. Preferably, a trunnion type bracket 24 has spaced apart downwardly and forwardly reaching arms 24a and 24b which provide a pivotal axis 26 about which the radio control head 12 can pivot within a limited range of movement.

Most advantageously, a releasable plug means, preferably a circular plug member 28 is secured to the trunnion bracket 24 by the bolt 30 and releasably fastened to the retainer 18 by a plurality of circumferentially spaced apart axially extending fingers 28a, which engage friction gripping surfaces of the bracket 18, firmly, but removable upon impact, holding the radio control head 12 in the desired position.

For a better understanding of the several components of this invention, reference is now made to FIGS. 6 and 7 which illustrate the detailed construction of the retainer 18. The retainer 18 includes a pair of recessed portions 32 to receive the heads of the bolts 20, as shown in FIGS. 2 and 3. Also, a molded out recess 34 is formed in the retainer 18 as a means of saving material in excess of the amount of material needed for proper strength. Two or more pairs of guides 36 are provided in the hollowed out portion 34. These guides receive any one of a pair of diametrically opposed finger members 28 so as to guide and hold the plug member 28 in a fixed predetermined orientation with respect to the retainer 18 so that impact in any direction will require approximately the same force to cause the releasable plug 28 to become dislodged from the retainer 18. The releasable plug 28 fits through an aperture 38 formed in the retainer 18 and which defines gripping surfaces 38a completely about the periphery of the aperture 38. However, it will be understood that the aperture 38, while illustrated preferably as being circular, may be any desired shape and the gripping surfaces 38a may be defined as sloping surfaces rather than flat surfaces.

A plurality of indexing notches or detents 40 are formed about the periphery of the aperture 38 at the underside of the bracket 18 to engage with correspondingly interleaved protuberances 39 formed on the trunnion bracket 24. The protuberances 39 fit between the spaces of the notches 40 and allow pivotal movement of the trunnion bracket 24 about the axis of the bolt 30 within sufficiently small increments, as provided by the angular displacement of each of the protuberances 39 and notches 40, thereby allowing the radio control head 12 to be tilted toward the operator of the motor vehicle to facilitate manipulation of the various controls on the control head 12. The protuberances 39 are best illustrated in FIG. 5 which is a fragmentary sectional view of the trunnion bracket 24. Once the trunnion bracket 24 is drawn up tight against the retainer 18, by tightening the bolt 30, the protuberances 39 and the detents 40 intermesh one with the other to firmly hold the trunnion bracket 24 in a nonrotatable position relative to the retainer 18. Rotational adjustment can be accomplished by loosening the bolt 30 sufficient to drop the trunnion bracket 24 to disengage the protuberances 39 and the detents 40 and rotating the trunnion bracket, and then retighten the bold 30.

FIGS. 8 and 9 illustrate the details of construction of the releasable plug member 28. Preferably, the releasable plug member 28 is made of a somewhat resilient material which allows the finger portions 28a thereof to be urged radially inwardly towards the axis of the plug member upon impact with the radio control head 12. That is, in one arrangement at least the finger portions 28a are to be of sufficiently resilient material to be pulled through the aperture 38 to allow break away action of the radio control head 12 from the retainer 18. The finger portions 28a include radially, outwardly extending tip portions 28b which overlie and engage with the friction gripping surfaces 38a. The plug member 28 can then be reused to again mount the radio control head 12. The radial dimension across the outer portions of the fingers 28a is only slightly less than the dimension of the aperture 38 so that the main body of the releasable plug 28 fits into the aperture 38 and the radially extending tips 28b engage with and grip the bracket 18. In another arrangement of this invention, the extended portion 28b may break off to allow the plug 28 to pull through the aperture 38.

FIG. 3 dramatically illustrates the finger portions 28a being driven inwardly towards the axis of the mounting bolt 30 so as to pull through the aperture 38 upon impact with the control head 12. However, it will be understood that should the releasable plus member 28 be made of a material which will cause shearing of the radially outwardly extending tip 28b, the same desirable effects will be obtained, i.e. the radio control head will break away upon impact. However, in this instance the releasable plug member 28 may not be reusable and a new one is required to remount the radio control head 12.

Preferably, the releasable plug 28 has a metal insert 42, such as brass of the like, which is molded in the plug and has threads formed therein to receive the mounting bolt 30. While all of the components which go into forming the break away mounting assembly 10 preferably are of high-impact molded plastic, or any other suitable plastic material, it will be noted that only the releasable plug member 28 is to have either a resilient or a severable quality which allows the finger members of the plug to either pull through or break off to allow the plug to separate from the retainer 18.

Although the break away mounting assembly 10 is here illustrated as being located at the underside of the dashboard, it will be understood that the mounting assembly 10 may, if desired, be located in any position within the interior of the motor vehicle. That is, it may be located on top of the dashboard or at the top or rear portions of the front seat of the motor vehicle. However, no matter where it is mounted, it will function as a safety device upon impact therewith by any part of the body, either of the operator of the motor vehicle or a passenger.

What has been described as a unique mounting assembly which allows break away action of a radio control head from a mounted position under the dashboard of a motor vehicle if, by chance, it is struck with sufficient impact by the operator's knee, or the like. The radio control head can be easily replaced by disassembling the mounting bracket and inserting the old releasable plug, if it is not damaged, or by inserting a new plug, if it is of the severable type. Accordingly, variation and modification of this invention may be effected without departing from the spirit and scope of the novel concepts disclosed and claimed herein.

I claim:

1. A mounting assembly for releasably holding an article to be mounted within the interior of a motor vehicle, comprising retainer means adapted to be fixedly secured to a support surface within the motor vehicle, said retainer means having a portion with a gripping surface with a circular aperture formed therein, a bracket adapted to be secured to the article to be mounted, with a portion of the bracket in engagement with a portion of said retainer means about the periphery of said aperture, releasable plug means secured to said bracket and having finger gripping portions extending therefrom to releasably engage said gripping surface on said retainer means, said releasable plug means including a disc member having spaced apart finger members at the periphery thereof which extend axially into said aperture of said retainer means, said finger members having outwardly turned tip portions to engage said gripping surface of said retainer means, whereby impact with the article so mounted will cause it to be released by separation of said releasable plug means from said retainer means.

2. The mounting assembly of claim 1 further including a plurality of equally spaced apart indexing notches formed on said retainer means about said circular aperture, and a corresponding plurality of interleaved indexing notches formed on said bracket to provide incremental indexed rotation of said bracket and the article secured thereto about an axis extending through said plug means.

3. The mounting assembly of claim 1 wherein said plug means is formed of resilient material, and has finger portions formed at the periphery thereof to extend through said aperture means with tip portions of the finger portions extending radially outwardly to overlie the gripping surfaces immediately adjacent said aperture means, whereby said finger portions and said tip portions of said plug means are bent inwardly and pulled through said aperture means upon impact with the article so mounted.

4. The mounting assembly of claim 1 wherein said bracket is a trunnion type bracket with parallel spaced apart outwardly and downwardly reaching arms to secure the article at the ends of said arms.

* * * * *

UNITED STATES PATENT OFFICE
CERTIFICATE OF CORRECTION

Patent No. 3,627,249　　　　　　　　Dated　　December 14, 1971

Inventor(s) Richard D. Lipinski

It is certified that error appears in the above-identified patent and that said Letters Patent are hereby corrected as shown below:

On the cover sheet [54] in the title "RATIO" should read -- RADIO -- .

Signed and sealed this 14th day of November 1972.

(SEAL)
Attest:

EDWARD M. FLETCHER, JR.　　　　　ROBERT GOTTSCHALK
Attesting Officer　　　　　　　　Commissioner of Patents